United States Patent [19]

Farnham

[11] 4,295,936

[45] Oct. 20, 1981

[54] FRACTIONATION APPARATUS PROVIDING IMPROVED HEAT RECOVERY FROM BOTTOM STREAM

[75] Inventor: Robert A. Farnham, San Rafael, Calif.

[73] Assignee: Chevron Research Company, San Francisco, Calif.

[21] Appl. No.: 53,124

[22] Filed: Jun. 28, 1979

[51] Int. Cl.³ .............................................. B01D 3/38
[52] U.S. Cl. ................................. 202/153; 202/158; 202/234; 203/100
[58] Field of Search ............... 202/153, 158, 159, 163, 202/176, 234; 159/DIG. 10, DIG. 11, DIG. 15, DIG. 23; 203/95–97, DIG. 25, 100, 76, 77, 83, 85, 99

[56] References Cited

U.S. PATENT DOCUMENTS

| Re. 28,524 | 8/1975 | Brebant .............................. 202/205 |
| 4,036,865 | 7/1977 | Hartmann et al. .................... 203/96 |
| 4,180,438 | 12/1979 | Brandt et al. ............... 203/DIG. 25 |

*Primary Examiner*—Frank Sever
*Attorney, Agent, or Firm*—D. A. Newell; S. R. LaPaglia; W. D. Reese

[57] ABSTRACT

An energy efficient design of fractionation column in which the liquid at the column bottom must be cooled to prevent thermal degradation, the column being provided with a perforated annular baffle through which liquid from the lowermost tray is channeled to the outlet of the column bottom, while a body of cooler recycled liquid is maintained in the column bottom outside of said baffle.

9 Claims, 1 Drawing Figure

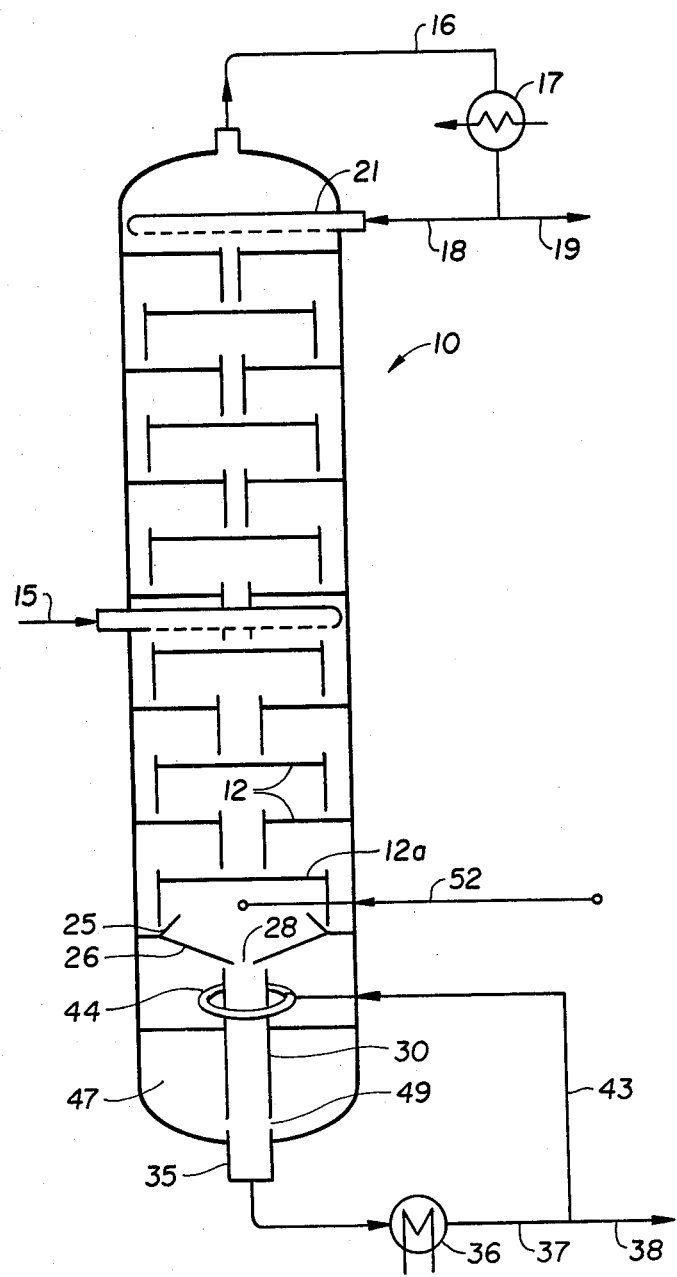

FRACTIONATION APPARATUS PROVIDING IMPROVED HEAT RECOVERY FROM BOTTOM STREAM

FIELD OF THE INVENTION

The invention relates to an apparatus for the fractional distillation of hydrocarbonaceous or organic compounds and is specifically directed to a high temperature fractionation apparatus designed to allow increased efficiency of heat recovery from the bottoms stream of a fractionation apparatus which has no reboiler.

Fractionation apparatus are used to separate constituents of a liquid mixture by partial vaporization of the mixture and separate recovery of the vapor and residual liquid. In some applications, the temperature of the high-boiling portion of the feed in the bottom of the fractionation column is higher than the temperature at which that portion can be maintained for any length of time without significant thermal degradation occurring. In these instances, typically found in a column such as a vacuum fractionation column of a crude oil distillation unit, thermal degradation is reduced by withdrawing a portion of the high-boiling fraction, or bottoms fraction, from the body of liquid at the bottom of the column, cooling and returning it to the body of liquid to form a cooler liquid mixture. This design, however, does not permit optimum heat recovery from the bottoms stream.

SUMMARY OF THE INVENTION

This invention provides an energy-efficient design of a high-temperature fractionation column not having a reboiler. The present design permits greater heat recovery from the bottom stream than is presently obtained while minimizing the residence time and thus the extent of thermal degradation of the higher boiling fractions in the column bottom.

In accordance with one embodiment of the present invention, there is provided in a fractionation apparatus comprising a vertically elongated fractionation column having a plurality of trays disposed therein, including a lowermost tray in a lower portion of said column, means for introducing a feed stream into the column at a point between the top and bottom thereof, means for removing a stream from a portion of said column above said feed means, means for removing a stream from a portion of said column below said feed means and means for providing a recycle portion of said bottoms stream to a lower portion of said column, the improvement which comprises a perforated generally annular baffle positioned within a lower portion of said column for directing fluid from the generally cylindrical fluid-retaining space within said baffle to said bottoms stream removal means, said baffle (a) extending upwardly from the bottom portion of said column and forming between said baffle and the lower side portion of said column a generally annular fluid-retaining space, (b) said cylindrical fluid-retaining space being in fluid communication via said perforations with said annular fluid-retaining space, and (c) the lower portion of said cylindrical fluid-retaining space being in fluid communication with said bottoms stream removal means; means for directing fluid from said lowermost tray into said cylindrical fluid-retaining space, said fluid-directing means being positioned above and spaced apart from said baffle and being in open fluid communication with the top of said cylindrical fluid-retaining space; and said bottoms stream recycle means providing said recycle portion of said bottoms stream to said annular fluid-retaining space.

In accordance with another embodiment of this invention, there is provided a fractionation apparatus comprising (1) a vertically elongated fractionation column, preferably having a substantially cylindrical cross-sectional configuration;

(2) a plurality of trays disposed horizontally within said column, including a lowermost tray in a lower portion of said column;

(3) means for introducing a feed stream into the column at a point between the top and bottom of said column;

(4) means for removing a stream from a portion of said column above said feed means;

(5) means for removing a stream from a portion of said column below said feed means;

(6) a perforated generally annular baffle positioned within a lower portion of said column for directing fluid from the generally cylindrical fluid-retaining space within said baffle to said bottoms stream removal means, said baffle (a) extending upwardly from the bottom portion of said column and forming between said baffle and the lower side portion of said column a generally annular fluid-retaining space, (b) said cylindrical fluid-retaining space being in fluid communication via said perforations with said annular fluid-retaining space, and (c) the lower portion of said cylindrical fluid-retaining space being in fluid communication with said bottoms stream removal means;

(7) means for directing fluid from said lowermost tray into said cylindrical fluid-retaining space, said fluid-directing means being positioned above and spaced apart from said baffle and being in open fluid communication with the top of said cylindrical fluid-retaining space;

(8) means for providing a recycle portion of said bottoms stream to said annular fluid-retaining space.

In another embodiment there is provided a method for recovering heat from the bottoms stream of a vertically-oriented fractionation column containing a plurality of trays which comprise (1) introducing a fractionatable fluid stream as a mixture of vapor and liquid phases into said column at a point between the top and bottom of said column;

(2) removing a vapor stream from a portion of said column above said feed introduction point;

(3) directing liquid from said lowermost tray into a generally cylindrical fluid-retaining space defined within an annular baffle;

(4) withdrawing liquid from a lower portion of said cylindrical fluid-retaining space to the outside of said column;

(5) recovering heat from said withdrawn fluid by indirect heat exchange with another fluid;

(6) maintaining a generally annular body of fluid between the baffle and the lower sideportion of said column at a predetermined level;

(7) returning at least a portion of the cooled fluid from step (5) to said annular body of fluid;

(8) passing a portion of said body of fluid into said cylindrical fluid-retaining space as necessary to maintain said level.

BRIEF DESCRIPTION OF THE DRAWING

The drawing is a schematic representation of a preferred embodiment of the fractionation apparatus in accordance with the present invention.

DETAILED DESCRIPTION

Fractionation column 10, presented in simplified form in the drawing, contains a series of trays generally designated by reference number 12, including a lowermost tray 12a. The trays may be bubble-cap trays, sieve trays, disc trays, donut trays or any other suitable type of trays that are operable in the system. The number of trays will depend in part upon the composition of the feed and the composition of the products desired from the fractionation. This design can also be used with packed fractionation columns. The present design is especially useful for "high temperature" fractionation columns in which the temperature of the liquid stream leaving the bottommost tray is above the temperature at which the body of liquid in the bottom of the column should be maintained in order to minimize thermal degradation of the liquid therein. Exemplary fractionation columns are those which process relatively high-boiling hydrocarbon fractions such as reduced crude or synthetic crudes, for example a vacuum fractionation column. Such columns may be maintained at atmospheric pressure, under superatmospheric pressure or less than atmospheric pressure.

The feedstock is passed into the column 10 onto one of the trays 12 intermediate the top and the bottom of the column. The exact location of the tray will depend upon the particular composition and temperature of the feed. The feed is generally charged as a mixed vapor-liquid phase and for the purpose of this embodiment, the feed will be charged at a temperature of 780° F. into a vacuum column.

In the top of the fractionation column is a vapor withdrawal line 16. Vapor in line 16 passes through condenser 17, and a portion of the condensed liquid is returned to an upper portion of the column 10 via line 18 and distributor 21, while the remaining portion is sent via line 19 to storage or further processing.

In the lower portion of the column, below lowermost tray 12a, is overflow seal pan 25 containing liquid at 764° F. The liquid which overflows seal pan 25 is directed by funnel 26 into baffle 30 from which it is withdrawn from the bottom of the column via line 35. The liquid thus withdrawn, at a temperature of approximately 732° F., is passed through exchanger 36 in which heat is recovered therefrom by indirect heat exchange with another fluid.

Liquid at approximately 460° F. exits exchanger 36 via line 37 and a portion of the cooled liquid is sent for further processing or to storage via line 38 while the remaining portion is recycled to the bottom of column 10 via line 43 and distributor 44. Distributor 44 distributes the cool liquid evenly into the body of fluid 47, held at a level in the bottom of column 10 by means not shown. Body of fluid 47 is maintained at approximately 500° F., a temperature low enough to minimize unwanted thermal degradation of the liquid. A portion of the body of liquid 47 is passed into baffle 30 by perforation 49 located in a lower portion of baffle 30. Stripping steam is charged via line 52 into a lower portion of column 10 below lowermost tray 12a.

An indication of relative flow rates in the present design contrasted with the prior art design is as follows:

In the present design approximately 31.5 thousand barrels per day exit column 10 via line 35. Of this amount, approximately 28.5 thousand barrels per day is removed via line 38 as product, with the remaining 3000 barrels per day being recycled to the column. In the prior art designs not having baffle 30, the body of liquid in the column bottom was maintained at a temperature of approximately 653° F. and about 45.1 thousand barrels per day of liquid was withdrawn from the column bottom and passed through a heat exchanger to cool the liquid to 460° F. Of the 45.1 thousand barrels per day, the same 28.5 thousand barrels per day is sent to product and 16.6 thousand barrels per day of the liquid is used as recycle. Thus, the method and apparatus of the present invention provides three benefits: (1) a higher quality of heat is available for heat exchange from the bottoms stream; (2) less than one-fifth the amount of cooled bottoms previously used need to be recycled to adequately cool the body of liquid in the bottom of the fractionation column thus saving on pumping costs; and (3) the overall degradation rate can be kept at or below the rate in prior art designs while still permitting increased efficiency of heat recovery.

Alternatively, in cases where minimizing the degree of thermal degradation of the bottoms liquid is more important than the efficiency of heat recovery, the present design can also be used to advantage. The bottoms temperature can be reduced without energy penalty compared to the conventional design.

Although only specific arrangements in mode of construction and operation of the present invention have been described and illustrated, numerous changes can be made in those arrangements and modes without departing from the spirit of the invention, and all such changes that fall within the scope of the appended claims are intended to be embraced thereby.

What is claimed is:

1. In a fractionation apparatus comprising a vertically elongated fractionation column having a plurality of trays disposed therein, including a lowermost tray in a lower portion of said column, means for introducing a feed stream into the column at a point between the top and bottom thereof, means for removing a stream from a portion of said column above said feed means, means for removing a bottoms stream from a portion of said column below said feed means, and means for providing a recycle portion of said bottoms stream to a lower portion of said column, the improvement which comprises a perforated generally annular baffle positioned within a lower portion of said column for directing fluid from the generally cylindrical fluid-retaining space within said baffle to said bottoms stream removal means, said baffle (a) extending upwardly from the bottom portion of said column and forming between said baffle and the lower side portion of said column a generally annular fluid-retaining space, (b) said cylindrical fluid-retaining space being in fluid communication via said perforations with said annular fluid-retaining space, and (c) the lower portion of said cylindrical fluid-retaining space being in fluid communication with said bottoms stream removal means; means for directing fluid from said lowermost tray into said cylindrical fluid-retaining space, said fluid-directing means being positioned above and spaced apart from said baffle and being in open fluid communication with the top of said cylindrical fluid-retaining space; and said bottoms stream recycle means providing said portion of said bottoms stream to said annular fluid-retaining space.

2. A fractionation apparatus comprising
(1) a vertically elongated fractionation column;
(2) a plurality of trays disposed horizontally within said column, including a lowermost tray in a lower portion of said column;
(3) means for introducing a feed stream into the column at a point between the top and bottom of said column;
(4) means for removing a stream from a portion of said column above said feed means;
(5) means for removing a stream from a portion of said column below said feed means;
(6) a perforated generally annular baffle positioned within a lower portion of said column for directing fluid from the generally cylindrical fluid-retaining space within said baffle to said bottoms stream removal means, said baffle (a) extending upwardly from the bottom portion of said column and forming between said baffle and the lower side portion of said column a generally annular fluid-retaining space, (b) said cylindrical fluid-retaining space being in fluid communication via said perforations with said annular fluid-retaining space, and (c) the lower portion of said cylindrical fluid-retaining space being in fluid communication with said bottoms stream removal means;
(7) means for directing fluid from said lowermost tray into said cylindrical fluid-retaining space, said fluid-directing means being positioned above and spaced apart from said baffle and being in open fluid communication with the top of said cylindrical fluid-retaining space;
(8) means for providing a recycle portion of said bottoms stream to said annular fluid-retaining space.

3. The apparatus of claim 2 wherein said bottoms recycle means includes a heat exchange means.

4. The apparatus of claim 2 wherein said baffle is insulated.

5. The apparatus of claim 2 wherein said perforations are in the lower portion of said baffle.

6. The apparatus of claim 2 wherein said fluid-directing means is positioned below said lowermost tray.

7. The apparatus of claim 2 wherein said lowermost tray has side downcomers, and said fluid-directing means directs flow of said fluid from the side of said column into said cylindrical fluid retaining space.

8. The apparatus of claim 2 wherein said fluid-directing means is centrally located in said lowermost tray, and both said perforated baffle and said bottoms stream removal means are axially positioned within said column.

9. In a distillation system including a vertically extending distillation vessel, distillation tray means disposed within the vessel spaced sufficiently from a bottom end of the vessel to provide a bottoms liquid retaining space in a lower portion of the vessel, a liquid outlet at the bottom end of the vessel, means for cooling liquid withdrawn from the vessel through the liquid outlet and means for introducing at least a portion of the resulting cooled liquid into the bottoms liquid retaining space, the improvement comprising:

means for conducting hotter liquid from the distillation tray means downwardly through the liquid retaining space to the liquid outlet and restricting mixing of the hotter liquid with cooler liquid in the liquid retaining space.

* * * * *